US008492475B2

(12) United States Patent
Araujo Da Silva et al.

(10) Patent No.: US 8,492,475 B2
(45) Date of Patent: Jul. 23, 2013

(54) RUBBER COMPOSITION FOR TIRE COMPRISING AN ORGANOSILOXANE COUPLING AGENT

(75) Inventors: José Carlos Araujo Da Silva, Pont-du-Chateau (FR); Karine Longchambon, Beaumont (FR); Sebastien Sterin, Saint Cyr au Mont d'or (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/038,887

(22) Filed: Mar. 2, 2011

(65) Prior Publication Data

US 2011/0152458 A1    Jun. 23, 2011

Related U.S. Application Data

(63) Continuation of application No. 11/920,626, filed as application No. PCT/EP2006/004435 on May 11, 2006, now abandoned.

(30) Foreign Application Priority Data

May 26, 2005 (FR) ...................... 05 05518

(51) Int. Cl.
*B60C 1/00* (2006.01)
*C08G 77/26* (2006.01)

(52) U.S. Cl.
USPC ............ 524/552; 428/405; 525/100; 525/105

(58) Field of Classification Search
None
See application file for complete search history.

(56) References Cited

U.S. PATENT DOCUMENTS

| | | | |
|---|---|---|---|
| 4,118,367 A | 10/1978 | Dawes et al. | |
| 5,185,418 A | 2/1993 | Furukawa et al. | |
| 5,227,425 A | 7/1993 | Rauline | |
| 5,362,794 A | 11/1994 | Inui et al. | |
| 5,852,099 A | 12/1998 | Vanel | |
| 5,900,449 A | 5/1999 | Custodero et al. | |
| 5,929,149 A | 7/1999 | Matsuo et al. | |
| 6,372,843 B1 | 4/2002 | Barruel et al. | |
| 2003/0114601 A1 | 6/2003 | Cruse et al. | |
| 2003/0144393 A1 | 7/2003 | Barruel et al. | |
| 2004/0132880 A1 | 7/2004 | Durel et al. | |
| 2004/0220307 A1 | 11/2004 | Wu | |
| 2006/0217473 A1 | 9/2006 | Hergenrother et al. | |

FOREIGN PATENT DOCUMENTS

| | | |
|---|---|---|
| EP | 501 227 | 9/1992 |
| EP | 0 581 618 A1 | 2/1994 |
| EP | 0735088 | 10/1996 |
| EP | 0810258 | 12/1997 |
| EP | 0 849 333 A | 6/1998 |
| EP | 0881252 | 12/1998 |
| FR | 2 340 323 A | 9/1977 |
| FR | 2 803 300 A | 7/2001 |
| FR | 2 823 215 A | 10/2002 |
| WO | WO 99/02590 | 1/1999 |
| WO | WO 99/06480 | 2/1999 |
| WO | WO 99/28376 | 6/1999 |
| WO | WO 00/05300 | 2/2000 |
| WO | WO 00/05301 | 2/2000 |
| WO | WO 00/73372 | 12/2000 |
| WO | WO 02/10269 | 2/2002 |
| WO | WO 02/053634 | 7/2002 |
| WO | WO 03/002648 | 1/2003 |
| WO | WO 03/002649 | 1/2003 |
| WO | WO 03/016387 A1 | 2/2003 |
| WO | WO 2004/003067 | 1/2004 |
| WO | WO 2004/056915 | 7/2004 |
| WO | WO 2004/056918 A1 | 7/2004 |

OTHER PUBLICATIONS

Dawes et al., "Chemical modification of natural rubber—a new silane coupling agent", Plastics & Rubber: Materials and Application, Feb. 1978, pp. 23-26.

*Primary Examiner* — Marc Zimmer
(74) *Attorney, Agent, or Firm* — Buchanan Ingersoll & Rooney PC

(57) ABSTRACT

A subject-matter of the present invention is a rubber composition intended for the manufacture of tires or of tire semi-finished products, based on at least one isoprene elastomer, an inorganic filler as reinforcing filler and a polyfunctional organosiloxane coupling agent capable of providing the bonding between the reinforcing inorganic filler and the isoprene elastomer, comprising per molecule, grafted to its silicon atoms, on the one hand at least one hydroxyl or hydrolysable functional group allowing it to be grafted to the reinforcing inorganic filler and, on the other hand, at least one group bearing at least one azodicarbonyl functional group —CO—N=N—CO— allowing it to be grafted to the isoprene elastomer.

10 Claims, No Drawings

RUBBER COMPOSITION FOR TIRE COMPRISING AN ORGANOSILOXANE COUPLING AGENT

This application claims the benefit under 35 U.S.C. §120 of the filing date of U.S. patent application Ser. No. 11/920,626 entitled RUBBER COMPOSITION FOR TIRE COMPRISING AN ORGANOSILOXANE COUPLING AGENT, which claims the benefit under 35 U.S.C. §371 of the international filing date of International Patent Application No. PCT/EP2006/004435, filed May 11, 2006, which claims priority to French Application No. 05/05518, filed May 26, 2005, the entire contents of each of which is hereby incorporated herein by reference.

The present invention relates to diene elastomer compositions reinforced with an inorganic filler, such as silica, intended for the manufacture of tyres or tyre semi-finished products, in particular for the treads of these tyres.

It relates more particularly to the coupling agents intended to provide the bonding, in such compositions, between these diene elastomers and these reinforcing inorganic fillers.

Major efforts have been made by tyre designers, so as to reduce the consumption of fuel and the pollution emitted by motor vehicles, in order to obtain tyres exhibiting both a very low rolling resistance, an improved grip, both on a dry surface and on a wet or snowy surface, and a good wear resistance.

This has been made possible in particular by virtue of the development of novel elastomer compositions reinforced with specific inorganic fillers, described as "reinforcing", which exhibit a high dispersibility, which are capable of competing with conventional carbon black from the reinforcing viewpoint and which additionally afford these compositions a reduced hysteresis synonymous with a lower rolling resistance for the tyres comprising them. Such rubber compositions, comprising reinforcing inorganic fillers, for example of the silica or alumina type, have been described, for example, in Patents or Patent Applications EP 501 227 or U.S. Pat. No. 5,227,425, EP 735 088 or U.S. Pat. No. 5,852,099, EP 810 258 or U.S. Pat. No. 5,900,449, EP 881 252, WO99/02590, WO99/06480, WO00/05300, WO00/05301 and WO02/10269.

The processability of the rubber compositions comprising such fillers nevertheless remains more difficult than for the rubber compositions conventionally comprising carbon black as filler. In particular, it is necessary to use a coupling agent, also referred to as bonding agent, the role of which is to provide the connection between the surface of the particles of inorganic filler and the elastomer while facilitating the dispersion of this inorganic filler within the elastomeric matrix.

It should be remembered here that (inorganic filler/elastomer) "coupling" agent has to be understood, in a known way, as meaning an agent capable of establishing a satisfactory connection, of chemical and/or physical nature, between the inorganic filler and the diene elastomer.

Such a coupling agent, which is at least bifunctional, has as simplified general formula "Y—W—X", in which:

Y represents a functional group ("Y" functional group) which is capable of being physically and/or chemically bonded to the inorganic filler, it being possible for such a bond to be established, for example, between a silicon atom of the coupling agent and the surface hydroxyl (OH) groups of the inorganic filler (for example, the surface silanols, when silica is concerned);

X represents a functional group ("X" functional group) capable of being physically and/or chemically bonded to the diene elastomer, for example via a sulphur atom;

W represents a divalent group which makes it possible to connect "Y" and "X".

The coupling agents should in particular not be confused with simple covering agents for the inorganic filler which, in a known way, may comprise the Y functional group, active with regard to the inorganic filler, but are in all cases devoid of the X functional group, active with regard to the diene elastomer.

Coupling agents, in particular (silica/diene elastomer) coupling agents, have been described in a large number of patent documents, the most well known being silane bifunctional sulphides, in particular alkoxysilanes, regarded today as the products contributing, for vulcanisates comprising silica as filler, the best compromise in terms of scorch safety, of ease of processability and of reinforcing power. Mention should very particularly be made, among these silane sulphides, of bis(3-triethoxysilylpropyl) tetrasulphide (abbreviated to TESPT), the reference coupling agent in tyres with a low rolling resistance described as "*Energy-saving Green Tyres*".

A search is still underway today to improve the performance of these coupling agents for inorganic fillers, such as silica.

The need is present in particular in the case of rubber matrices based on an isoprene elastomer, such as those used in the treads of tyres for heavy-duty vehicles, in which, in a known way, an effective bond which the elastomer is much more difficult to obtain, in comparison with the use of carbon black.

While pursuing their research, the Applicant Companies have discovered a novel coupling agent for inorganic filler which makes it possible to very significantly improve, in the presence of an isoprene elastomer, the hysteresis of the rubber compositions, consequently the rolling resistance of the tyres and thus the energy consumption of the motor vehicles equipped with such tyres.

Consequently, a first subject-matter of the invention is a rubber composition intended for the manufacture of tyres or of tyre semi-finished products, based on at least one isoprene elastomer, an inorganic filler as reinforcing filler and a polyfunctional organosiloxane coupling agent comprising per molecule, to provide the bonding between the reinforcing inorganic filler and the isoprene elastomer, grafted to its silicon atoms, on the one hand at least one hydroxyl or hydrolysable functional group allowing it to be grafted to the reinforcing inorganic filler and, on the other hand, at least one group bearing at least one functional group allowing it to be grafted to the isoprene elastomer, the said composition being characterized in that the said functional group is an azodicarbonyl group —CO—N=N—CO—.

Another subject-matter of the invention is a process for preparing a rubber composition intended for the manufacture of tyres or of tyre semi-finished products exhibiting an improved hysteresis, this composition being based on an isoprene elastomer, on a reinforcing inorganic filler and on a polyfunctional organosiloxane coupling agent, the said process comprising the following stages:

incorporating in an isoprene elastomer, during a first "non-productive" stage, one or more times, at least one reinforcing inorganic filler and all or a first portion of the organosiloxane coupling agent which provides the bonding between the said reinforcing inorganic filler and the isoprene elastomer, the combined mixture being kneaded thermomechanically, in one or more stages, until a maximum temperature of between 110° C. and 190° C. is reached;

cooling the mixture to a temperature of less than 100° C.;

subsequently incorporating, during a second "productive" stage, if applicable the second portion of the coupling agent and then a crosslinking (or vulcanizing) system;

kneading the entire mixture until a maximum temperature of less than 120° C. is reached, and being characterized in that the said organosiloxane coupling agent corresponds to the definition given above.

Another subject-matter of the invention is the use of a composition according to the invention for the manufacture of tyres or of semi-finished products made of rubber intended for these tyres, these semi-finished products being chosen in particular from the group consisting of treads, crown reinforcement plies, side walls, carcass reinforcement plies, beads, protectors, underlayers, rubber blocks and other internal rubbers, in particular decoupling rubbers, intended to provide the bonding or the interface between the abovementioned regions of the tyres.

Another subject-matter of the invention is these tyres and these semi-finished products themselves when they comprise a rubber composition in accordance with the invention. The invention relates in particular to tyre treads, it being possible for these treads to be used during the manufacture of new tyres or for the retreading of waste tyres; by virtue of the compositions of the invention, these treads exhibit both high wear resistance and reduced rolling resistance.

The composition in accordance with the invention is particularly suitable for the manufacture of tyres or of tyre treads intended for equipping passenger vehicles, vans, for 4×4 (4-wheel drive) vehicles, two-wheel vehicles, heavy-duty vehicles, that is to say underground, bus, heavy road transport vehicles (lorries, tractors, trailers) or off-road vehicles, aircraft, earthmoving equipment, heavy agricultural vehicles or handling vehicles.

The invention and its advantages will be easily understood in the light of the description and of the exemplary embodiments which follow.

I. MEASUREMENTS AND TESTS USED

The rubber compositions are characterized, before and after curing, as indicated below.

I-1. Rheometry:

The measurements are carried out at 150° C. with an oscillating disc rheometer, according to Standard DIN 53529—part 3 (June 1983). The change in the rheometric torque as a function of time describes the change in the stiffening of the composition as a result of the vulcanization reaction. The measurements are processed according to Standard DIN 53529-part 2 (March 1983); Ti is the induction time, that is to say the time necessary at the starting of the vulcanization reaction; $T_\alpha$, (for example $T_{99}$) is the time necessary to achieve a conversion of $\alpha\%$, that is to say $\alpha\%$ (for example 99%) of the difference between the minimum and maximum torques. The conversion rate constant, recorded as K (expressed as $min^{-1}$), which is first order, calculated between 30% and 80% conversion, which makes it possible to assess the vulcanization kinetics, is also measured.

I-2. Tensile Tests

These tests make it possible to determine the elasticity stresses and the properties at break. Unless otherwise indicated, they are carried out in accordance with French Standard NF T 46-002 of September 1988. The nominal secant moduli (or apparent stresses, MPa) are measured in second elongation (i.e., after a cycle of accommodation) at 10% elongation (recorded as M10), 100% elongation (M100) and 300% elongation (M300). The breaking stresses (in MPa) and the elongations at break (in %) are also measured.

I-3. Dynamic Properties

The dynamic properties $\Delta G^*$ and $tan(\delta)_{max}$ are measured on a viscosity analyser (Metravib VA4000) according to Standard ASTM D 5992-96. The response of a sample of vulcanized composition (cylindrical test specimen with a thickness of 4 mm and with a cross section of 400 $mm^2$), subjected to a simple alternating sinusoidal shear stress, at a frequency of 10 Hz, at 60° C. is recorded. A strain amplitude sweep is carried out from 0.1% to 50% (outward cycle) and then from 50% to 1% (return cycle). The results made use of are the complex dynamic shear modulus (G*) and the loss factor tan δ. The maximum value of tan δ observed ($tan(\delta)_{max}$) and the difference in complex modulus ($\Delta G^*$) between the values at 0.1% and at 50% strain (Payne effect) are shown for the return cycle.

II. DETAILED DESCRIPTION OF THE INVENTION

The rubber compositions according to the invention are based on at least an (that is to say at least one) isoprene elastomer; an (at least one) inorganic filler as reinforcing filler; and an (at least one) organosiloxane coupling agent as described in detail below, which provide the bonding between the said inorganic filler and the isoprene elastomer.

Of course, the expression composition "based on" is to be understood as meaning a composition comprising the mixture and/or the reaction product of the various constituents used, some of these base constituents (for example, the coupling agent and the reinforcing inorganic filler) being capable of reacting or intended to react together, at least in part, during the various phases of manufacture of the compositions, in particular during their vulcanization (curing).

In the present description, unless expressly indicated otherwise, all the percentages (%) indicated are % by weight.

II-1. Isoprene Elastomer

It should be remembered first of all that the term "diene" elastomer (or rubber, the two terms being regarded here as synonymous) should be understood as meaning by definition an elastomer resulting at least in part (i.e., a homopolymer or a copolymer) from diene monomers, that is to say from monomers bearing two carbon-carbon double bonds which may or may not be conjugated. The term "essentially unsaturated" diene elastomer is understood here to mean a diene elastomer resulting at least in part from conjugated diene monomers having a level of units of diene origin (conjugated dienes) which is greater than 15% (mol %). In the category of "essentially unsaturated" diene elastomers, the term "highly unsaturated" diene elastomer is understood to mean in particular a diene elastomer having a level of units of diene origin (conjugated dienes) which is greater than 50%.

Given these general definitions, the term "isoprene elastomer" is understood to mean, in the present patent application, in a known way, an isoprene homopolymer or copolymer, in other words a diene elastomer chosen from the group consisting of natural rubber (NR), synthetic polyisoprenes (IR), the various copolymers of isoprene and the blends of these elastomers. Mention will in particular be made, among isoprene copolymers, of isobutene/isoprene copolymers (butyl rubber-IIR), isoprene/styrene copolymers (SIR), isoprene/butadiene copolymers (BIR) or isoprene/butadiene/styrene copolymers (SBIR).

This isoprene elastomer is preferably natural rubber or a synthetic polyisoprene of the cis-1,4 type. Use is preferably made, among these synthetic polyisoprenes, of polyisoprenes having a level (mol %) of cis-1,4 bonds of greater than 90%, more preferably still of greater than 98%.

The compositions of the invention may contain, as a blend with the above isoprene elastomer, diene elastomers other than isoprene elastomers, as the minor component (i.e., for less than 50% by weight) or as the major component (i.e., for more than 50% by weight), according to the applications targeted. They might also comprise nondiene elastomers, indeed even polymers other than elastomers, for example thermoplastic polymers. Mention will in particular be made, as examples of such nonisoprene diene elastomers, of any highly unsaturated diene elastomer chosen in particular from the group consisting of polybutadienes (BR), butadiene copolymers, in particular styrene/butadiene copolymers (SBR), and the blends of these various elastomers.

The improvement in the coupling contributed by the invention is particularly notable with regard to rubber compositions for which the elastomeric base is composed predominantly (i.e., to more than 50% by weight) of polyisoprene, i.e., natural rubber or synthetic polyisoprene.

The composition in accordance with the invention is intended in particular for a tyre tread, whether a new tyre or a waste tyre (retreading), in particular for a tyre intended for commercial or utility vehicles, such as heavy-duty vehicles, i.e. underground, bus, heavy road transport vehicles (lorries, tractors, trailers) or off-road vehicles.

In such a case, the best embodiment known of the invention consists in using, as isoprene elastomer, solely polyisoprene, more preferably natural rubber. It is for such conditions that the best performance in terms of rolling resistance and wear resistance has been observed.

However, a person skilled in the art of tyres will understand that the various blends between isoprene elastomer, in particular natural rubber, and other diene elastomers, in particular SBR and/or BR, are also possible in rubber compositions in accordance with the invention which can be used, for example, for various parts of the tyre other than its tread, for example crown reinforcement plies (for example working plies, protection plies or hooping plies), carcass reinforcement plies, side walls, beads, protectors, underlayers, rubber blocks and other internal rubbers providing the interface between the abovementioned regions of the tyres.

According to another preferred embodiment of the invention, in particular when it is intended for a tyre side wall or for an airtight internal rubber of a tubeless tyre (or other air-impermeable component), the composition in accordance with the invention may contain at least one essentially saturated diene elastomer, in particular at least one EPDM copolymer or one butyl rubber (optionally chlorinated or brominated), whether these copolymers are used alone or as a blend with highly unsaturated diene elastomers as mentioned above, in particular NR or IR, BR or SBR.

II-2. Reinforcing Inorganic Filler

The term "reinforcing inorganic filler" is to be understood as meaning here, in a known way, any inorganic or mineral filler, whatever its colour and its origin (natural or synthetic), also known as "white" filler, "clear" filler or even "nonblack" filler, in contrast with carbon black, this inorganic filler being capable of reinforcing, by itself alone, without means other than an intermediate coupling agent, a rubber composition intended for the manufacture of a tyre tread, in other words capable of replacing, in its reinforcing role, a conventional tyre-grade carbon black for a tread. Such a filler is generally characterized by the presence of functional groups, in particular hydroxyl (—OH) groups, at its surface, thus requiring the use of a coupling agent or system intended to provide a stable chemical bond between the isoprene elastomer and the said filler.

Preferably, the reinforcing inorganic filler is a filler of the siliceous or aluminous type or a mixture of these two types of fillers.

The silica ($SiO_2$) used can be any reinforcing silica known to a person skilled in the art, in particular any precipitated or pyrogenic silica exhibiting a BET specific surface and a CTAB specific surface which are both less than 450 $m^2/g$, preferably from 30 to 400 $m^2/g$. Highly dispersible precipitated silicas ("HDSs") are preferred, in particular when the invention is employed for the manufacture of tyres exhibiting a low rolling resistance; mention may be made, as examples of such silicas, of the Ultrasil 7000 silicas from Degussa, the Zeosil 1165 MP, 1135 MP and 1115 MP silicas from Rhodia, the Hi-Sil EZ150G silica from PPG, the Zeopol 8715, 8745 or 8755 silicas from Huber or the silicas as described in Application WO 03/016387.

The reinforcing alumina ($Al_2O_3$) preferably used is a highly dispersible alumina having a BET specific surface ranging from 30 to 400 $m^2/g$, more preferably between 60 and 250 $m^2/g$, and a mean particle size at most equal to 500 nm, more preferably at most equal to 200 nm. Mention may in particular be made, as nonlimiting examples of such reinforcing aluminas, of the "Baikalox A125" or "CR125" (Baïkowski), "APA-100RDX" (Condea), "Aluminoxide C" (Degussa) or "AKP-G015" (Sumitomo Chemicals) aluminas.

Mention may also be made, as other examples of inorganic filler capable of being used in the rubber compositions of the invention, of aluminium (oxide) hydroxides, aluminosilicates, titanium oxides, silicon carbides or nitrides, all of the reinforcing type as described, for example, in Applications WO 99/28376, WO 00/73372, WO 02/053634, WO 2004/003067 and WO 2004/056915.

When the treads of the invention are intended for tyres with a low rolling resistance, the reinforcing inorganic filler used, in particular if it is silica, preferably has a BET specific surface of between 60 and 350 $m^2/g$. An advantageous embodiment of the invention consists in using a reinforcing inorganic filler, in particular a silica, having a high BET specific surface within a range from 130 to 300 $m^2/g$, due to the high reinforcing power recognized for such fillers. According to another preferred embodiment of the invention, use may be made of a reinforcing inorganic filler, in particular a silica, exhibiting a BET specific surface of less than 130 $m^2/g$, preferably in such a case of between 60 and 130 $m^2/g$ (see, for example, Applications WO03/002648 and WO03/002649).

The physical state under which the reinforcing inorganic filler is provided is not important, whether it is in the form of a powder, of microbeads, of granules, of balls or any other appropriate densified form. Of course, the term reinforcing inorganic filler is also understood to mean mixtures of different reinforcing inorganic fillers, in particular of highly dispersible siliceous and/or aluminous fillers as described above.

A person skilled in the art will know how to adjust the level of reinforcing inorganic filler according to the nature of the inorganic filler used and according to the type of tyre concerned, for example a tyre for a motorcycle, for a passenger vehicle or for a utility vehicle, such as a van or a heavy-duty vehicle. Preferably, this level of reinforcing inorganic filler will be chosen between 20 and 200 phr, more preferably between 30 and 150 phr, in particular greater than 40 phr (for example between 40 and 120 phr, in particular between 40 and 80 phr).

In the present account, the BET specific surface is determined in a known way by gas adsorption using the Brunauer-Emmett-Teller method described in "*The Journal of the American Chemical Society*", Vol. 60, page 309, February 1938, more specifically according to French Standard NF ISO 9277 of December 1996 (multipoint volumetric method (5 points)—gas: nitrogen—degassing: 1 hour at 160° C.—relative pressure range p/po: 0.05 to 0.17). The CTAB specific surface is the external surface determined according to French Standard NF T 45-007 of November 1987 (method B).

Finally, a person skilled in the art will understand that a reinforcing filler of another nature, in particular an organic filler, might be used as equivalent filler to the reinforcing inorganic filler described in the present section, provided that this reinforcing filler is covered with an inorganic layer, such as silica, or else comprises, at its surface, functional sites, in particular hydroxyl sites, requiring the use of a coupling agent in order to establish the bonding between the filler and the elastomer.

II-3. Organosiloxane Coupling Agent

It should first of all be remembered that, according to definitions well known to a person skilled in the art:
- the term "organosilicon compound" must be understood as meaning an organic compound including at least one carbon-silicon bond;
- the term "silyl group" must be understood as meaning a group bearing just one (it is then described as monosilyl) or several (it is then described as polysilyl) silicon atom(s);
- the term "organosiloxane" must be understood as meaning any oligomeric or polymeric organic compound comprising at least one (i.e., one or more) ≡Si—O—Si≡ group(s), and the mixtures of such compounds.

As explained above, an (inorganic filler/diene elastomer) coupling agent carries, in a known way, at least two functional groups, recorded here as "Y" and "X", which allow it to be able to be grafted, on the one hand, to the reinforcing inorganic filler by means of the "Y" functional group and, on the other hand, to the diene elastomer by means of the "X" functional group.

A covering agent for the inorganic filler comprises the "Y" functional group alone, for example a hydroxyl group or a hydrolysable group, active with regard to the functional sites (for example hydroxyl —OH sites) of the inorganic filler, but is in any case devoid of the second "X" functional group, active with regard to the diene elastomer.

The coupling agent used in the rubber compositions in accordance with the invention is a polyfunctional (that is to say, at least bifunctional) organosiloxane comprising per molecule, grafted to its silicon atoms, on the one hand at least one hydroxyl or hydrolysable functional group ("Y" radical or functional group above) allowing it to be grafted to the reinforcing inorganic filler and, on the other hand, which is the essential characteristic of this organosiloxane for the targeted application, at least one group bearing at least one azodicarbonyl functional group —CO—N=N—CO— ("X" radical or functional group) allowing it to be grafted to the isoprene elastomer.

A person skilled in the art will easily understand that the expression "polyfunctional organosiloxane" above is thus understood to mean any siloxane compound bearing, as "Y" functional group, at least one siloxyl unit equipped with one, two or three OH group(s) or to hydrolysable monovalent group(s) and, as "X" functional group, at least one siloxyl unit equipped with at least one azo double bond activated by the presence of a carbonyl group (>C=O) on each of the two nitrogen atoms, allowing the formation of a covalent bond with the isoprene elastomer.

In other words, the polyfunctional organosiloxane which can be used in the composition of the invention is an organosiloxane composed of identical or different siloxyl units of the following average formula (I):

$$G^3_c G^2_b G^1_a SiO_{(4-a-b-c)/2} \quad (I)$$

in which:
- a, b and c are each whole or fractional numbers from 0 to 3;
- the $G^1$ radicals, which are identical or different if several are present, represent a monovalent hydrocarbon radical;
- the $G^2$ radicals, which are identical or different if several are present, represent a hydroxyl or hydrolysable group ("Y" functional group);
- the $G^3$ radicals, which are identical or different if several are present, represent a group ("X" functional group) bearing the azodicarbonyl functional group (—CO—N=N—CO—), with the proviso that:
- $0<(a+b+c)\leq 3$;
- at least one $G^2$ radical (i.e., $b\geq 1$) and at least one $G^3$ radical (i.e., $c\geq 1$) are present in the siloxane molecule.

The simplified notation used in the formula (I) above is well known to a person skilled in the art in the field of organosiloxanes; it encompasses the various specific formulae possible for the siloxyl units, whatever in particular their degree of functionalization, their position on the siloxane molecule or chain (for example along the chain or at the chain end(s)) or the nature of the siloxane (for example, a linear, branched or cyclic polyorganosiloxane or a random, sequential or block copolymer).

It will in particular be understood that the $G^2$ and $G^3$ radicals can be carried by the same silicon atom or by two different silicon atoms.

According to a preferred embodiment, $G^3$ has the specific formula (II):

$$A-CO-N=N-CO-Z- \quad (II)$$

in which:
- Z is a divalent bonding group which makes it possible to connect the azodicarbonyl functional group to a silicon atom of the organosiloxane;
- A represents a monovalent hydrocarbon radical or the group of formula Z' in which Z', which is identical to or different from Z, is a divalent bonding group which makes it possible to connect the azodicarbonyl functional group to a silicon atom (identical to or different from the Si atom connected to Z) of the organosiloxane;
- A, Z and if applicable Z', independently, may comprise one or more heteroatoms.

In other words, the organosiloxane is composed of identical or different siloxyl units of average formula (III):

$$(A-CO-N=N-CO-Z)_c G^2_b G^1_a SiO_{(4-a-b-c)/2} \quad (III)$$

in which A and Z have the definitions given above for the formula (II).

In this formula (III), it should be clearly understood that the $G^3$ radical (A-CO—N=N—CO—Z) is connected to an Si atom via the —Z— divalent radical.

According to a particularly preferred embodiment, the organosiloxane carries a single $G^3$ radical, that is to say that c=1.

In other words, the preferred organosiloxane above is composed of identical or different siloxyl units of equivalent average formula (IV) or (V):

$$G^3 G^2_b G^1_a SiO_{(3-a-b)/2} \quad (IV)$$

$$G^2_b G^1_a (A-CO-N=N-CO-Z)SiO_{(3-a-b)/2} \quad (V)$$

in which:
the $G^1$, $G^2$ and $G^3$ radicals have the definitions given above;
a is a whole or fractional number from 0 to 2;
b is a whole or fractional number from 1 to 2;
with the proviso that $(a+b) \leq 2$.

This organosiloxane of formula (IV) or (V) may also be represented, in accordance with another symbolic representation well known to a person skilled in the art for organosiloxane compounds, according to the equivalent formula (VI) or (VII) respectively:

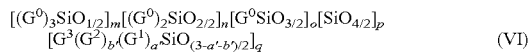

(VI)

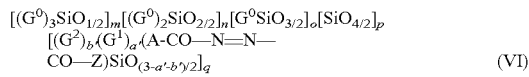

(VI)

in which:
a' represents an integer chosen from 0, 1 and 2;
b' represents an integer chosen from 0, 1 and 2;
the sum a'+b' lies within the range extending from 0 to 2, with the condition according to which, when b'=0, then at least one of the $G^0$ symbols corresponds to the definition of $G^2$;
either at least one of the symbols m, n, o or p is a whole or fractional number other than 0 (zero) and q represents a whole or fractional number equal to or greater than 1;
or q is greater than 1 and then each of the symbols m, n, o or p has any value;
the $G^0$ symbols, which are identical or different, each represent one of the groups corresponding to $G^2$ or $G^1$;
A, Z, $G^1$, $G^2$ and $G^3$ have the definitions given above for the general formula (I) or for the specific formulae (II) to (V).

The organosiloxane is preferably a siloxane oligomer comprising from 2 to 20, more preferably from 2 to 12 (for example from 2 to 6), silicon atoms (number corresponding to the sum m+n+o+p+q of the formula VII).

Such preferred siloxane oligomers are, for example, those in the formula (VII) of which:
a+b=1 or 2;
m lies within the range extending from 1 to 2;
n=p=o=0 (zero); and
q=1,
it being possible for these siloxane oligomers optionally, depending on their specific conditions of synthesis, to be associated with one (or more) azo functionalized organosiloxane(s) (bearing a $G^3$ radical) corresponding in fact to the formula (VII) above in which a+b=3; m=n=o=p=0 (zero); and q=1.

The divalent group Z is preferably chosen from saturated or unsaturated aliphatic hydrocarbon groups, saturated, unsaturated and/or aromatic, monocyclic or polycyclic, carbocyclic groups and groups exhibiting a saturated or unsaturated aliphatic hydrocarbon part and a carbocyclic part as defined above. This group Z preferably comprises from 1 to 18 carbon atoms; more preferably it represents an alkylene chain, a saturated cycloalkylene group, an arylene group or a divalent group composed of a combination of at least two of these groups.

The monovalent hydrocarbon group which may be represented by A may be linear or branched, aliphatic or carbocyclic, in particular aromatic; it can be saturated or unsaturated and substituted or unsubstituted.

In the present description, the term aliphatic hydrocarbon group is understood to mean an optionally substituted linear or branched group preferably comprising from 1 to 18 carbon atoms. Advantageously, the said aliphatic hydrocarbon group comprises from 1 to 12 carbon atoms, better still from 1 to 8 carbon atoms and more preferably still from 1 to 6 carbon atoms.

Mention may be made, as saturated aliphatic hydrocarbon group, of alkyl groups, such as methyl, ethyl, propyl, isopropyl, n-butyl, isobutyl, t-butyl, pentyl, isopentyl, neopentyl, 2-methylbutyl, 1-ethylpropyl, hexyl, isohexyl, neohexyl, 1-methylpentyl, 3-methylpentyl, 1,1-dimethylbutyl, 1,3-dimethylbutyl, 2-ethylbutyl, 1-methyl-1-ethylpropyl, heptyl, 1-methylhexyl, 1-propylbutyl, 4,4-dimethylpentyl, octyl, 1-methylheptyl, 2-ethylhexyl, 5,5-dimethylhexyl, nonyl, decyl, 1-methylnonyl, 3,7-dimethyloctyl, 7,7-dimethyloctyl and hexadecyl.

The unsaturated aliphatic hydrocarbon groups which may be used comprise one or more unsaturations, preferably one, two or three unsaturations of ethylenic (double bond) and/or acetylenic (triple bond) type. Examples thereof are the alkenyl or alkynyl groups deriving from the alkyl groups defined above by removal of two or more hydrogen atoms. Preferably, the unsaturated aliphatic hydrocarbon groups comprise a single unsaturation.

The term carbocyclic radical is understood to mean an optionally substituted, preferably $C_3$-$C_{50}$, monocyclic or polycyclic radical. Advantageously, it is a $C_3$-$C_{18}$ radical which is preferably mono-, bi- or tricyclic. When the carbocyclic radical comprises more than one cyclic nucleus (case of polycyclic carbocycles), the cyclic nuclei are fused in pairs. Two fused nuclei can be ortho-fused or peri-fused. The carbocyclic radical may comprise, unless otherwise indicated, a saturated part and/or an aromatic part and/or an unsaturated part.

Examples of saturated carbocyclic radicals are cycloalkyl groups. Preferably, the cycloalkyl groups are $C_3$-$C_{18}$, better still $C_5$-$C_{10}$, cycloalkyl groups. Mention may in particular be made of the cyclopentyl, cyclohexyl, cycloheptyl, cyclooctyl, adamantyl or norbornyl radicals.

The unsaturated carbocycle or any unsaturated part of carbocyclic type exhibits one or more ethylenic unsaturations, preferably one, two or three. It advantageously comprises from 6 to 50 carbon atoms, better still from 6 to 20 carbon atoms, for example from 6 to 18 carbon atoms.

Examples of unsaturated carbocycles are $C_6$-$C_{10}$ cycloalkenyl groups. Examples of aromatic carbocyclic radicals are $C_6$-$C_{18}$ aryl groups and in particular phenyl, naphthyl, anthryl and phenanthryl.

A group exhibiting both an aliphatic hydrocarbon part as defined above and a carbocyclic part as defined above is, for example, an arylalkyl group, such as benzyl, or an alkylaryl group, such as tolyl.

The substituents of the aliphatic hydrocarbon groups or parts and of the carbocyclic groups or parts are, for example, alkoxyl groups in which the alkyl part is preferably as defined above.

Z' can be identical to Z or different from the latter; it makes it possible to connect the azodicarbonyl functional group to an Si atom of the organosiloxane, it being possible for the latter to be identical to or different from the Si atom connected to Z. Z' has the same definition and the same preferred characteristics as those described above for Z.

According to a particularly preferred embodiment, at least one of the A, Z and, if applicable, Z' groups comprises a (at least one) heteroatom preferably chosen from O, S and N. This heteroatom is preferably connected directly to the adjacent carbonyl bond.

When such a heteroatom is carried by the monovalent hydrocarbon radical A, it is preferably carried in the form of a monovalent hydrocarbon residue chosen from —OR, —NR and —SR (R being any monovalent hydrocarbon radical preferably comprising from 1 to 18 carbon atoms), the free valency of which is more preferably directly connected to the adjacent carbonyl bond; the —OR residue is preferred, with R representing a $C_1$-$C_6$ alkyl, preferably a $C_1$-$C_4$ alkyl (methyl, ethyl, propyl, butyl), more preferably a $C_1$ alkyl (methyl) or a $C_2$ alkyl (ethyl).

When such a heteroatom is carried by Z and/or, if applicable, Z' (i.e., by Z only, by Z' only or by both), it is preferably carried in the form of a divalent hydrocarbon residue chosen from the —R'—NH—; —R'—O; and residues (R' being any divalent hydrocarbon radical preferably comprising from 1 to 18 carbon atoms); the —R'—NH— residue is preferred, with R' representing a $C_1$-$C_6$ alkylene, preferably a $C_1$-$C_4$ alkylene (methylene, ethylene, propylene, butylene), more preferably a $C_3$ alkylene (propylene).

According to a particularly preferred embodiment, at least one, more preferably all, of the following characteristics is/are confirmed in the formulae (I) to (VII) above:
the $G^1$ radicals, which are identical to or different from one another, are chosen from the group consisting of $C_1$-$C_6$ alkyl groups, the cyclohexyl group and the phenyl group;
the $G^2$ radicals, which are identical to or different from one another, are chosen from the group consisting of the hydroxyl group, $C_1$-$C_8$ alkoxyl groups and $C_5$-$C_8$ cycloalkoxyl groups.

According to a more particularly preferred embodiment, at least one, more preferably all, of the following characteristics is/are confirmed in the formulae (I) to (VII) above:
the $G^1$ radicals are chosen from $C_1$-$C_4$ alkyls, more particularly from methyl and ethyl;
the $G^2$ radicals are chosen from hydroxyl and $C_1$-$C_4$ alkoxyls, more particularly from hydroxyl, methoxyl and ethoxyl.

$G^1$ and $G^2$ might also form, together and with the silicon atom which carries them, a monocyclic or polycyclic carbocyclic group having from 2 to 10 cyclic carbon atoms and being able to comprise one or more cyclic heteroatom(s) which is/are oxygen(s). Mention will be made, by way of example, of, for example, the rings:

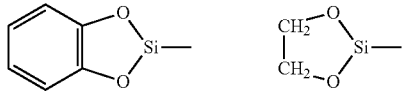

Azosilanes of formula (V) in the structure of which the A symbol comprises an oxygen atom as heteroatom and which correspond to the preferred characteristics set out above are in particular those composed of identical or different siloxyl units of average formula (VIII) which follows:

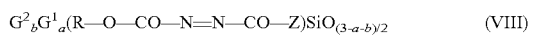

in which:
a, b, Z, $G^1$ and $G^2$ have the definitions given above;
R represents a $C_1$-$C_6$, preferably $C_1$-$C_4$, alkyl (in particular methyl or ethyl).

Azosiloxanes of formula (V) in the structure of which A=Z' and which correspond to the preferred characteristics set out above are in particular those composed of identical or different siloxyl units of average formula (IX):

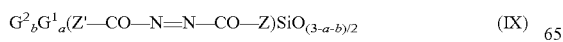

in which:
a, b, Z, Z', $G^1$ and $G^2$ have the definitions given above.

The following characteristics are preferably confirmed in the preceding formulae, in particular (VIII) and (IX):
$G^1$ is the methyl or ethyl radical;
$G^2$ is the hydroxyl, methoxyl or ethoxyl radical;
Z (and, if applicable, Z') represents a divalent hydrocarbon radical comprising from 1 to 18 carbon atoms, preferably a $C_1$-$C_{10}$ alkylene.

The following characteristics are more preferably confirmed in these preceding formulae, in particular (VIII) and (IX):
$G^1$ is the methyl radical;
$G^2$ is the hydroxyl or ethoxyl radical;
Z (and, if applicable, Z') is a $C_1$-$C_{10}$ alkylene comprising a heteroatom preferably chosen from O, S and N.

In these preceding formulae, more preferably still, Z (and, if applicable, Z') is a divalent radical chosen from the group consisting of —$(CH_2)_y$—, —NH—$(CH_2)_y$— and —O—$(CH_2)_y$—, y being an integer from 1 to 6, in particular from 1 to 4, especially equal to 1

The organosiloxane coupling agents described above can be prepared, for example, according to a synthetic process which consists in oxidizing the hydrazo group of a precursor reactant of formula (X):

using an oxidizing system comprising at least one oxidizing agent (for example a halogen, such as bromine) and at least one base (for example an inorganic base, such as $Na_2CO_3$), while involving an additional reactant chosen from mono- and polyalkoxysilanes (by way of example, trimethylethoxysilane) and while preferably operating in an organic liquid medium (for example while using a solvent, such as dichloromethane).

An advantageous procedure for bearing out this process consists in charging to the reactor, at ambient temperature (23° C.): the precursor reactant (X) above, the base (its amount depending on the oxidizing agent employed; for example, in the case of bromine, two molar equivalents of base are used with respect to the bromine), the organic solvent and the additional reactant (its amount corresponding, for example, to at least one molar equivalent with respect to the precursor), and in then gradually adding the oxidizing system to the reaction medium (the molar amount of oxidizing system being, for example, stoichiometric with respect to that of the precursor).

As regards the precursor reactant (X), it can be prepared by first of all reacting a precursor silane of formula $(G^2)_b(G^1)_a$Si—$P^1$ with a precursor hydrazo derivative of formula $P^2$—NH—NH—CO-A, in which formulae the $G^1$, $G^2$ and A symbols are as defined above, a+b=3 and $P^1$ and $P^2$ represent groups each having a structure and a functionality such that these groups are capable of reacting with one another to give rise to the central sequence —Z—CO— so as to result in the hydrazo compound of formula (X).

In the case, for example, of the preparation of this hydrazo compound of formula (X) in the structure of which the Z symbol then represents the divalent radical —NH—$(CH_2)_y$— (y being an integer from 1 to 6, preferably 1 to 4, more preferably equal to 3), the synthetic scheme applied is, for example, as follows:
a precursor silane of formula $(G^2)_a(G^1)_{3-a}$Si—$(CH_2)_y$—NCO is reacted;
with a precursor hydrazo derivative of formula $H_2N$—NH—CO-A;
to produce the final hydrazo compound of formula (X).

As regards the practical manner of bearing out the process which has just been described in order to obtain the hydrazo compound (X), reference may be made, for example, to the patent document FR-A-2 340 323 (or U.S. Pat. No. 4,118, 367).

Mention may be made, as example of an azosiloxane compound of generic formula (VII) in which:
a'=0 (zero);
b'=2;
q=1;
m=1;
n=p=o=0 (zero),
of, for example, the compound of formula (XI) (Me=methyl, Et=ethyl):

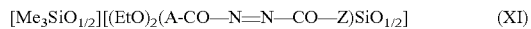
[Me$_3$SiO$_{1/2}$][(EtO)$_2$(A-CO—N═N—CO—Z)SiO$_{1/2}$]  (XI)

in particular the compound of specific formula (XI-1) in the structure of which the A symbol represents the monovalent radical Et-O— and the Z symbol represents the divalent radical —NH—(CH$_2$)$_3$—:

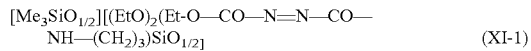
[Me$_3$SiO$_{1/2}$][(EtO)$_2$(Et-O—CO—N═N—CO—NH—(CH$_2$)$_3$)SiO$_{1/2}$]  (XI-1)

It should be remembered that the representation of the formulae (XI) and (XI-1) above means, in a way well known to a person skilled in the art, that there thus exists a first Si atom bearing both the "X" (activated azo) functional group and two "Y" (ethoxy) functional groups, this Si atom sharing (on its 4$^{th}$ valency) an oxygen atom with a second Si atom bearing only three methyl groups.

Such a compound of formula (XI-1) can thus be represented in the following expanded form:

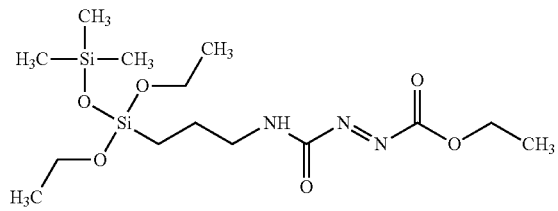 [SMILES: CCOC(=O)/N=N/C(=O)NCCC[Si](OCC)(OCC)O[Si](C)(C)C]

Mention may be made, as another example of an azosiloxane compound of generic formula (VII) in which:
a'=1;
b'=1;
q=1;
m=2;
n=p=o=0 (zero),
of, for example, the compound of formula (XII) (Me=methyl, Et=ethyl):

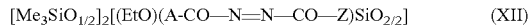
[Me$_3$SiO$_{1/2}$]$_2$[(EtO)(A-CO—N═N—CO—Z)SiO$_{2/2}$]  (XII)

in particular the compound of specific formula (XII-1) in the structure of which the A symbol represents the monovalent radical Et-O— and the Z symbol represents the divalent radical —NH—(CH$_2$)$_3$—:

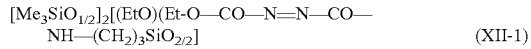
[Me$_3$SiO$_{1/2}$]$_2$[(EtO)(Et-O—CO—N═N—CO—NH—(CH$_2$)$_3$SiO$_{2/2}$]  (XII-1)

The above representation of the formulae (XII) and (XII-1) means, in a known way, that there exists a central Si atom bearing the "X" (activated azo) functional group and the "Y" (ethoxy) functional group on two of its valencies, sharing an oxygen atom with two adjacent Si atoms bearing only three methyl groups each.

Such a compound of formula (XII-1) can thus be represented in the following expanded form:

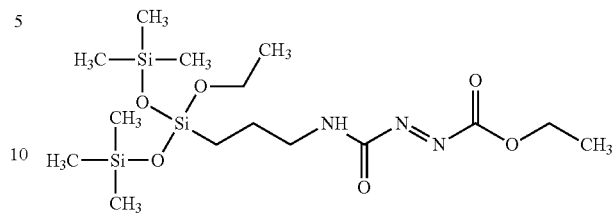

In the rubber compositions in accordance with the invention, the overall content of coupling system is preferably between 2 and 15 phr, more preferably between 2 and 12 phr (for example between 4 and 8 phr). However, it is generally desirable to use as little as possible thereof. With respect to the weight of reinforcing nonblack inorganic filler, the level of coupling system typically represents between 0.5 and 15% by weight, with respect to the amount of inorganic filler; preferably, it is less than 12% by weight, more preferably less than 10% by weight, with respect to this amount of filler.

All or a portion of the coupling system according to the invention might be pregrafted (via the "X" functional groups) to the isoprene elastomer of the composition of the invention, the elastomer thus functionalized or "precoupled" then comprising the free "Y" functional groups for the reinforcing inorganic filler. All or a portion of this coupling system might also be pregrafted (via the "Y" functional groups) to the reinforcing inorganic filler, it being possible for the filler thus "precoupled" subsequently to be bonded to the diene elastomer via the free "X" functional groups. However, it is preferable, in particular for reasons of better use of the rubber compositions in the raw state, to use all or a portion of the coupling agent either grafted to the filler or in the free state (i.e., nongrafted).

II-4. Various Additives

The rubber compositions in accordance with the invention also comprise all or a portion of the usual additives generally used in elastomer compositions intended for the manufacture of tyres or tyre semi-finished products, such as, for example, plasticizing agents or extending oils, whether the latter are aromatic or nonaromatic in nature, pigments, protection agents, such as antiozone waxes, chemical antiozonants, antioxidants, which it is preferable to keep present in the body, antifatigue agents, reinforcing or plasticizing resins, bismaleimides, methylene acceptors (for example, phenolic novolak resin) or methylene donors (for example, HMT or H3M), such as described, for example, in the abovementioned Application WO 02/10269, a crosslinking system based either on sulphur or on sulphur donors and/or on peroxides and/or on bismaleimides, vulcanization accelerators and/or activators, or antireversion agents, such as, for example, sodium hexathiosulphonate or N,N'-m-phenylene biscitraconimide. A person skilled in the art will know how to adjust the formulation of the composition according to his specific requirements.

Preferably, these compositions comprise, as preferred non-aromatic or very slightly aromatic plasticizing agent, at least one compound chosen from the group consisting of naphthenic oils, paraffinic oils, MES oils, TDAE oils, glycerol esters (in particular trioleates), plasticizing hydrocarbon resins exhibiting a high Tg preferably of greater than 30° C., and the mixtures of such compounds. The overall level of such a preferred plasticizing agent is preferably between 15 and 45 phr, more preferably between 20 and 40 phr.

Inert fillers (i.e., nonreinforcing fillers), such as particles of clay, bentonite, talc, chalk, kaolin, which can be used, for example, in side walls or treads of coloured tyres, can also be added, depending on the targeted application, to the reinforcing filler described above, that is to say the nonblack reinforcing filler (in particular inorganic filler) plus carbon black, if applicable.

These compositions can also comprise, in addition to the coupling agents, coupling activators, covering agents (comprising, for example, just the "Y" functional group) of the nonblack reinforcing filler and more generally processing aids capable, in a known way, by virtue of an improvement in the dispersion of the nonblack filler in the rubber matrix and of a lowering in the viscosity of the compositions, of improving their processing property in the raw state, these agents being, for example, hydroxylated or hydrolysable silanes, such as hydroxysilanes, or alkylalkoxysilanes (in particular alkyltriethoxysilanes), polyols, polyethers (for example polyethylene glycols), primary, secondary or tertiary amines (for example trialkanolamines), hydroxylated or hydrolysable polyorganosiloxanes, for example $\alpha,\omega$-dihydroxypolyorganosiloxanes (in particular $\alpha,\omega$-dihydroxypolydimethylsiloxanes), and the mixtures of such compounds.

II-5. Preparation of the Rubber Compositions

The compositions are manufactured in appropriate mixers using two successive preparation phases well known to a person skilled in the art: a first phase of thermomechanical working or kneading (sometimes referred to as "nonproductive" phase) at high temperature, up to a maximum temperature (recorded as $T_{max}$) of between 110° C. and 190° C., preferably between 130° C. and 180° C., followed by a second phase of mechanical working (sometimes referred to as "productive" phase) at a lower temperature, typically of less than 120° C., for example between 60° C. and 100° C., finishing phase during which the crosslinking or vulcanization system is incorporated.

The manufacturing process according to the invention is characterized in that at least the reinforcing inorganic filler and all or a portion of the coupling agent are incorporated by kneading with the diene elastomer, during the first "nonproductive" phase, that is to say that at least these various base constituents are introduced into the mixer and that kneading is carried out thermomechanically, in one or more stages, until a maximum temperature of between 110° C. and 190° C., preferably between 130° C. and 180° C., is reached.

By way of example, the first (nonproductive) phase is carried out in a single thermomechanical stage during which, in a first step, all the necessary base constituents (diene elastomer, reinforcing inorganic filler and all or a portion of the coupling agent) are introduced into an appropriate mixer, such as a normal internal mixer, followed, in a second step, for example after kneading for one to two minutes, by the optional additional covering agents or processing aids and various other additives, with the exception of the vulcanization system. The total duration of the kneading, in this nonproductive phase, is preferably between 2 and 10 min. After cooling the mixture thus obtained, the second part of the coupling agent, if applicable, and then the vulcanization system are then incorporated at low temperature, generally in an external mixer such as an open mill; the entire mixture is then mixed (productive phase) for a few minutes, for example between 5 and 15 minutes.

According to various possible alternative embodiments, all of the organosiloxane coupling agent can be introduced during the nonproductive phase, at the same time as the inorganic filler, or otherwise in a form divided up (for example in a proportion of 75/25, 50/50 or 25/75 respective parts by weight) over the two phases, respectively nonproductive (i.e., in the internal mixer) and then productive (for example, in the external mixer).

It should be noted that it is possible to introduce all or a portion of the organosiloxane in a form supported (placing on the support being carried out beforehand) on a solid compatible with the chemical structures corresponding to this compound; such a support is in particular carbon black. For example, when dividing up between the two successive phases above, it may be advantageous to introduce the second portion of the organosiloxane, onto the external mixer, after placing on a support in order to facilitate the incorporation thereof and the dispersion thereof.

The final composition thus obtained is subsequently calendered, for example in the form of a sheet, or else extruded, for example to form a rubber profiled element used for the manufacture of semi-finished products, such as treads, crown reinforcement plies, side walls, carcass reinforcement plies, beads, protectors, air chambers or airtight internal rubbers for a tubeless tyre.

The vulcanization (or curing) is carried out in a known way at a temperature generally of between 130° C. and 200° C., preferably under pressure, for a sufficient time which can vary, for example, between 5 and 90 min, depending in particular on the curing temperature, the vulcanization system adopted and the vulcanization kinetics of the composition under consideration.

The vulcanization system proper is preferably based on sulphur and on a primary vulcanization accelerator, in particular an accelerator of the sulphenamide type. Various known vulcanization activators or secondary accelerators, such as zinc oxide, stearic acid, guanidine derivatives (in particular diphenylguanidine), optional antireversion agents, and the like, incorporated during the first nonproductive phase and/or during the productive phase, are additional to this crosslinking system. Sulphur is used at a preferable level of between 0.5 and 10 phr, more preferably of between 0.5 and 5.0 phr, for example between 0.5 and 3.0 phr, when the invention is applied to a tyre tread. The primary vulcanization accelerator is used at a preferable level of between 0.5 and 10 phr, more preferably of between 0.5 and 5.0 phr in particular when the invention applies to a tyre tread.

The invention relates to the rubber compositions described above both in the "raw" state (i.e., before curing) and in the "cured" or vulcanized state (i.e., after crosslinking or vulcanization). The compositions in accordance with the invention can be used alone or as a blend (i.e., as a mixture) with any other rubber composition which can be used for the manufacture of tyres.

III. EXAMPLES OF THE IMPLEMENTATION OF THE INVENTION

III-1. Synthesis of the Azosiloxane Coupling Agent

This example illustrates the preparation of the organosiloxanes of formula (XI) and (XII) which are particularly well suited, in the structure of which the A symbol represents the monovalent radical Et-O— and the Z symbol represents a divalent radical —NH—$(CH_2)_3$—, the synthetic scheme applied being, for example, the following.

10 g (28.4 mmol, 1 eq.) of the following compound 1 (Et=ethyl):

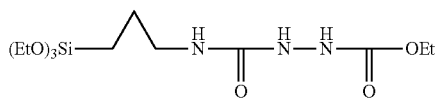

are introduced into a 250 ml reactor, followed by 7.53 g (71 mmol, i.e. 2.5 eq.) of dry Na$_2$CO$_3$ and 50 ml of a 50/50 (vol/vol) mixture of trimethylethoxysilane and dichloromethane. A solution of 4.55 g of bromine (28.4 mmol, i.e. 1 eq.) in 15 ml of dichloromethane is added dropwise over 1 hour. The reaction mixture is stirred for an additional 30 min after the end of the addition of the bromine.

The reaction mixture is subsequently filtered and then concentrated under vacuum. 9.77 g of a bright orange fluid liquid are obtained. $^1$H NMR analysis shows that the compound 1 has been completely consumed, that the azo group has been selectively formed and that the SiOEt loss is limited.

The final product obtained is a mixture of the two siloxane entities of formulae (XI-1) and (XII-1):

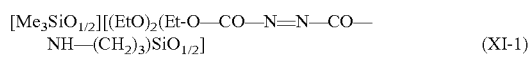

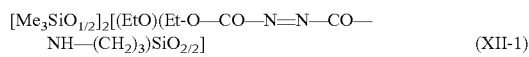

the expanded formulae of which have been given above, with the addition of a silane of formula C$_2$H$_5$—O—CO—N═N—CO—NH—(CH$_2$)$_3$—Si(OC$_2$H$_5$)$_3$.

III-2. Preparation of the Rubber Compositions

The tests which follow are carried out in the following way: the natural rubber, the reinforcing filler, a portion (approximately ⅓) of the coupling agent and then, after kneading for one to two minutes, the various other ingredients, with the exception of the vulcanization system, are introduced into an internal mixer, 70% filled and having an initial vessel temperature of approximately 80° C. Thermomechanical working (nonproductive phase) is then carried out in one stage (total duration of the kneading equal to approximately 4 min) until a maximum "dropping" temperature of approximately 160° C. is reached. The mixture thus obtained is recovered and cooled and then the remainder of the coupling agent and then the vulcanization system (sulphur and sulphenamide accelerator) are added on an external mixer (homofinisher), the combined mixture being mixed (productive phase) for approximately 5-10 min.

The compositions thus obtained are subsequently calendered, either in the form of sheets (thickness of 2 to 3 mm) or of fine sheets of rubber, for the measurement of their physical or mechanical properties, or in the form of profiled elements which can be used directly, after cutting and/or assembling to the desired dimensions, for example as tyre semi-finished products, in particular as tyre treads.

III-3. Characterization of the Rubber Compositions

The aim of this test is to demonstrate the improved coupling performance contributed by the siloxane coupling agent synthesized above (paragraph III-1), compared with a conventional coupling agent of the alkoxysilane type (TESPT).

For this, two compositions based on natural rubber which are reinforced with an HDS silica are prepared, these two compositions differing only in the nature of the coupling agents used:

composition C-1: conventional silane coupling agent;
composition C-2: azosiloxane coupling agent.

The same number of moles of "Y" functional groups, that is to say silyl groups bearing at least one functional group —OEt reactive with respect to the silica and its surface hydroxyl groups, were used for these two compositions.

The conventional coupling agent of the control composition C-1 is TESPT. It should be remembered that TESPT is bis(3-triethoxysilylpropyl) tetrasulphide, sold in particular by Degussa under the name "Si69", of formula (Et=ethyl):

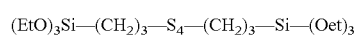

or, in expanded form:

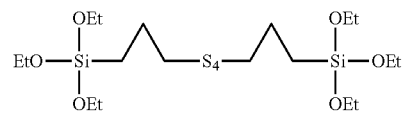

Tables 1 and 2 give the formulations of the various compositions (Table 1—levels of the various products, expressed in phr—parts by weight per one hundred parts of elastomer) and also their rheometric properties and properties after curing (at 150° C. for approximately 20 min); the vulcanization system is composed of sulphur and sulphenamide.

The examination of the various results in Table 2 shows first of all, for the composition in accordance with the invention C-2 compared with the control composition C-1, markedly faster vulcanization kinetics, illustrated by a conversion rate constant K which is markedly greater (multiplied by approximately 1.8) and by a markedly reduced curing time (T$_{99}$-Ti) (divided by 1.8).

After curing, the composition in accordance with the invention exhibits substantially equivalent properties at break, but the highest values for modulus under strong strain (M100 and M300) and for M300/M100 ratio, a clear indicator to a person skilled in the art of better reinforcing contributed by the inorganic filler and the siloxane coupling agent.

Finally and above all, the composition of the invention reveals a markedly improved hysteresis, as is shown by substantially reduced values for tan(δ)$_{max}$ and ΔG*, which is the recognized indicator of a reduction in the rolling resistance of tyres and consequently in the energy consumption of the motor vehicles equipped with such tyres.

The invention has particularly advantageous applications in rubber compositions intended for the manufacture of tyre treads based on isoprene elastomer, in particular when these treads are intended for tyres for commercial vehicles of the heavy-duty type.

TABLE 1

| | Composition No.: | |
|---|---|---|
| | C-1 | C-2 |
| NR (1) | 100 | 100 |
| silica (2) | 50 | 50 |
| carbon black (3) | 4 | 4 |
| coupling agent (4) | 4 | — |
| coupling agent (5) | — | 5.5 |
| ZnO | 3 | 3 |

TABLE 1-continued

| | Composition No.: | |
|---|---|---|
| | C-1 | C-2 |
| antioxidant (6) | 1.9 | 1.9 |
| stearic acid | 2.5 | 2.5 |
| sulphur | 1.5 | 1.5 |
| accelerator (7) | 1.8 | 1.8 |

(1) peptized natural rubber NR;
(2) "Zeosil 1165 MP" silica from Rhodia in the form of microbeads (BET and CTAB: approximately 150-160 m²/g);
(3) carbon black N330 (Degussa);
(4) TESPT ("Si69", Degussa);
(5) azosilane (synthesis of section III-1);
(6) N-1,3-dimethylbutyl-N-phenyl-para-phenylenediamine ("Santoflex 6-PPD" from Flexsys);
(7) N-cyclohexyl-2-benzothiazolesulphenamide ("Santocure CBS" from Flexsys).

TABLE 2

| | Composition No.: | |
|---|---|---|
| | C-1 | C-2 |
| Properties before curing: | | |
| Ti (min) | 7.9 | 10.6 |
| $T_{99}$-Ti (min) | 17.6 | 9.9 |
| K (min$^{-1}$) | 0.261 | 0.467 |
| Properties after curing: | | |
| M10 (MPa) | 5.11 | 5.41 |
| M100 (MPa) | 1.84 | 2.49 |
| M300 (MPa) | 1.81 | 3.73 |
| M300/M100 | 0.99 | 1.50 |
| tan($\delta$)$_{max}$ | 0.147 | 0.105 |
| $\Delta G^*$ | 1.97 | 1.29 |
| breaking stress (MPa) | 20 | 19 |
| elongation at break (%) | 720 | 530 |

The invention claimed is:

1. A tire comprising a rubber composition based on at least one isoprene elastomer, an inorganic filler as reinforcing filler and a polyfunctional organosiloxane coupling agent which provides the bonding between the said reinforcing inorganic filler and the isoprene elastomer, wherein the organosiloxane corresponds to the formula (VII):

$$[(G^0)_3SiO_{1/2}]_m[(G^0)_2SiO_{2/2}]_n[G^0SiO_{3/2}]_o[SiO_{4/2}]_p$$
$$[(G^2)_b(G^1)_a(A\text{-CO}\text{---}N\text{=}N\text{---}CO\text{---}Z)SiO_{(3-a'-b'/2)}]_q$$

in which:
Z is a divalent bonding group connecting the azodicarbonyl functional group to a silicon atom of the organosiloxane;
A represents (i) a monovalent radical which can be unsubstituted or substituted hydrocarbon or a monovalent residue selected from the group consisting of —OR', —NR', and —SR', wherein R' is a monovalent hydrocarbon radical, or (ii) the group of formula Z' in which Z', which is identical to or different from Z, and is a divalent bonding group which makes it possible to connect the azodicarbonyl functional group to a silicon atom (identical to or different from the Si atom connected to Z) of the organosiloxane;
A, Z and if applicable Z', independently, may comprise one or more heteroatoms;
a' represents an integer chosen from 0, 1 and 2;
b' represents an integer chosen from 0, 1 and 2; the sum a'+b' is equal to 1 or 2 with the condition according to which, when b'=0, then at least one of the $G^0$ symbols corresponds to the definition of $G^2$;
m lies within the range from 1 to 2; n=o=p=0 (zero) and q=1;
the $G^0$ symbols, which are identical or different, each represent one of the groups corresponding to $G^2$ or $G^1$
the $G^1$ radicals, which are identical or different if several are present, represent a monovalent hydrocarbon radical;
the $G^2$ radicals, which are identical or different if several are present, represent a hydroxyl or hydrolysable group.

2. The tire according to claim 1, the organosiloxane corresponding to at least one of the formulae (XI) and (XII) (Et=ethyl):

$$[Me_3SiO_{1/2}][(EtO)_2(A\text{-CO}\text{---}N\text{=}N\text{---}CO\text{---}Z)SiO_{1/2}] \quad (XI)$$

$$[Me_3SiO_{1/2}]_2[(EtO)(A\text{-CO}\text{---}N\text{=}N\text{---}CO\text{---}Z)SiO_{2/2}] \quad (XII).$$

3. The tire according to claim 2, the organosiloxane being a siloxane oligomer comprising from 2 to 12, silicon atoms.

4. The tire according to claim 2, the A symbol representing the monovalent radical Et-O— and the Z symbol representing the divalent radical
—NH—(CH$_2$)$_3$—.

5. The tire according to claim 1, in which:
the $G^1$ radicals, which are identical to or different from one another, are chosen from the group consisting of $C_1$-$C_6$ alkyl groups, the cyclohexyl group and the phenyl group;
the $G^2$ radicals, which are identical to or different from one another, are chosen from the group consisting of the hydroxyl group, $C_1$-$C_8$ alkoxyl groups and $C_5$-$C_8$ cycloalkoxyl groups.

6. The tire according to claim 5, in which:
the radicals $G^1$ are chosen from methyl and ethyl;
the radicals $G^2$ are chosen from hydroxyl, methoxyl and ethoxyl.

7. The tire according to claim 1, in which:
$G^1$ is the methyl or ethyl radical;
$G^2$ is the hydroxyl, methoxyl or ethoxyl radical;
Z (and, if applicable, Z') represents a divalent hydrocarbon radical comprising from 1 to 18 carbon atoms.

8. The tire according to claim 7, in which:
$G^1$ is the methyl radical;
$G^2$ is the hydroxyl or ethoxyl radical;
Z (and, if applicable, Z') is a $C_1$-$C_{10}$ alkylene comprising a heteroatom chosen from O, S and N.

9. The tire according to claim 8, in which Z (and, if applicable, Z') is a divalent radical chosen from the group consisting of —(CH$_2$)$_y$—,
—NH—(CH$_2$)$_y$— and —O—(CH$_2$)$_y$—, y being an integer from 1 to 6.

10. The tire according to claim 1, wherein the rubber composition is present in the tread of the tire.

* * * * *